US007930627B2

(12) United States Patent
Ming

(10) Patent No.: US 7,930,627 B2
(45) Date of Patent: *Apr. 19, 2011

(54) OFFICE DOCUMENT MATCHING METHOD AND APPARATUS

(75) Inventor: Wei Ming, Cupertino, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 11/231,768

(22) Filed: Sep. 22, 2005

(65) Prior Publication Data

US 2007/0067713 A1 Mar. 22, 2007

(51) Int. Cl.
*G06F 17/22* (2006.01)
(52) U.S. Cl. .................... 715/229; 715/200
(58) Field of Classification Search .......... 715/511, 715/229
See application file for complete search history.

(56) References Cited

U.S. PATENT DOCUMENTS

| 4,272,756 | A | 6/1981 | Kakumoto et al. |
|---|---|---|---|
| 5,675,672 | A | 10/1997 | Nakabayashi |
| 5,774,824 | A | 6/1998 | Streit et al. |
| 5,982,951 | A | 11/1999 | Katayama et al. |
| 6,285,329 | B1 | 9/2001 | Nagaev |
| 6,304,313 | B1 | 10/2001 | Honma |
| 6,493,469 | B1 | 12/2002 | Taylor et al. |
| 6,594,403 | B1 | 7/2003 | Bozdagi et al. |
| 6,757,445 | B1 | 6/2004 | Knopp |
| 6,865,289 | B1 | 3/2005 | Berestov |
| 6,885,776 | B2 | 4/2005 | Takakura et al. |
| 7,339,614 | B2 | 3/2008 | Gruber et al. |
| 7,343,049 | B2 * | 3/2008 | Butterworth ................. 382/284 |
| 7,352,898 | B2 * | 4/2008 | Kitagawara et al. ......... 382/173 |
| 2001/0019636 | A1 | 9/2001 | Slatter |
| 2002/0041717 | A1 * | 4/2002 | Murata et al. ................ 382/275 |

(Continued)

FOREIGN PATENT DOCUMENTS

WO   WO 01/95109 A2   12/2001

OTHER PUBLICATIONS

Lienhart et al. "Localizing and Segmenting Text in Images and Videos," *IEEE Transactions on Circuits and Systems for Video Technology*, vol. 12, No. 4, Apr. 2002, pp. 256-268.

(Continued)

*Primary Examiner* — Doug Hutton
*Assistant Examiner* — Tionna Smith
(74) *Attorney, Agent, or Firm* — Finnegan, Henderson, Farabow, Garrett & Dunner, L.L.P.

(57) ABSTRACT

The present application relates to an image processing apparatus and a method for matching and combining two documents with at least some overlap area. Layout features are extracted from the two documents and used to determine common layout areas of the first and second documents, where the common layout area has the same layout in the first and the second documents. Text data in the common layout areas of the first and second documents are also detected and used to determine common text data of the first and second documents, where the common text data is the same in the first and the second documents. Feature points are extracted from the common layout areas of the first and second documents based on the common text data and the first and second documents may be combined based on the feature points.

9 Claims, 6 Drawing Sheets

U.S. PATENT DOCUMENTS

| | | | |
|---|---|---|---|
| 2002/0051575 A1* | 5/2002 | Myers et al. | 382/202 |
| 2002/0057848 A1 | 5/2002 | Tan et al. | |
| 2002/0126890 A1 | 9/2002 | Katayama et al. | |
| 2002/0159636 A1 | 10/2002 | Lienhart et al. | |
| 2003/0147558 A1 | 8/2003 | Loui et al. | |
| 2003/0169923 A1 | 9/2003 | Butterworth | |
| 2004/0220898 A1* | 11/2004 | Eguchi et al. | 707/1 |

OTHER PUBLICATIONS

Linhong et al. "A Stitching Algorithm of Still Pictures with Camera Translation," *Proceedings of the First International Symposium on Cyber Worlds*, 2002, pp. 1-7.

U.S. Appl. No. 11/231,769, filed Sep. 22, 2005, Wei Ming.

Notice of Allowance dated Mar. 20, 2009, in related U.S. Appl. No. 11/231,769, filed Sep. 22, 2005, Wei Ming.

Office Action dated Nov. 14, 2008, in related U.S. Appl. No. 11/231,769, filed Sep. 22, 2005, Wei Ming.

Office Action dated Apr. 22, 2008, in related U.S. Appl. No. 11/231,769, filed Sep. 22, 2005, Wei Ming.

U.S. Appl. No. 11/231,770, filed Sep. 22, 2005, Wei Ming.

Notice of Allowance dated Feb. 24, 2009, in lreated U.S. Appl. No. 11/231,770, filed Sep. 22, 2005, Wei Ming.

Office Action dated Sep. 17, 2009, in related U.S. Appl. No. 11/231,770, filed Sep. 22, 2005, Wei Ming.

* cited by examiner

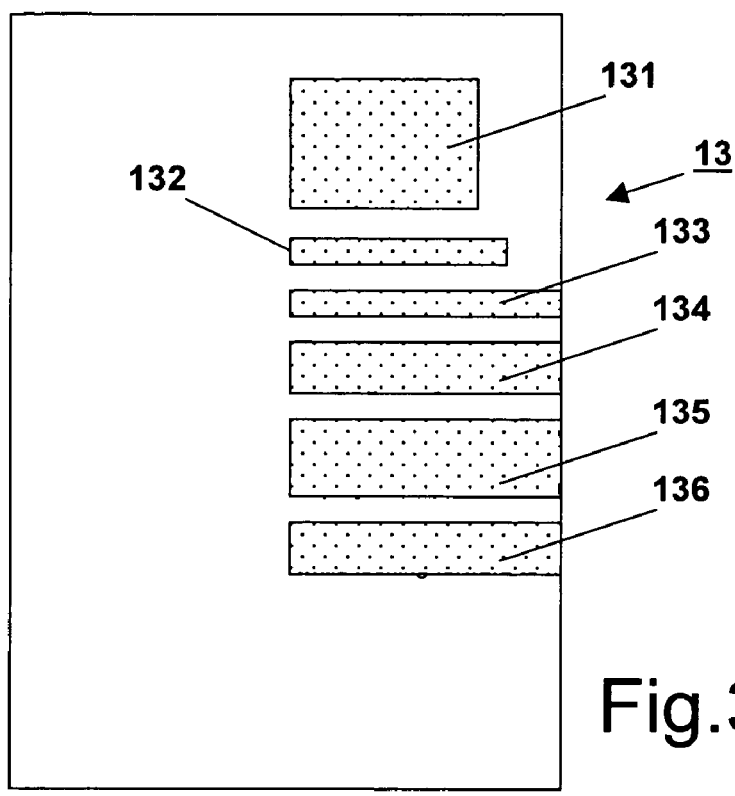
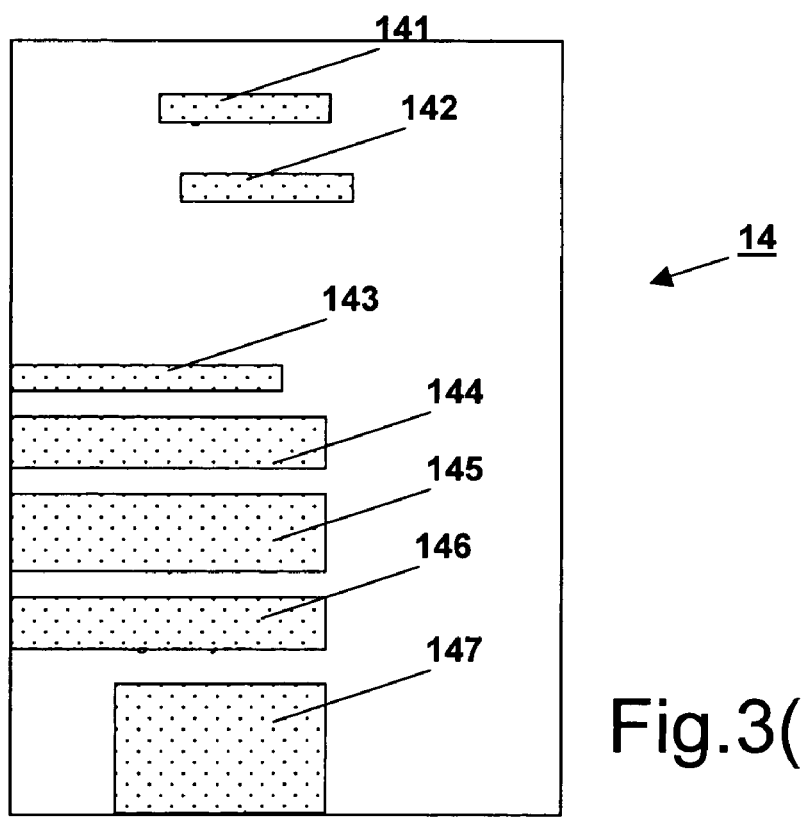

COMMON AREA

August 21, 2005

Mr. Jack Jackson
General Counsel
ABC Corporation
300 ABC way,
Sunnyvale, CA

-Confidential-

Dear Mr. Jackson:

Thank you for your letter of July 20, 2005.

As informed in our last letter, we'd like to have a meeting with you regarding this issue.

If you do not mind, could you come to our site in Sunnyvale on September 20, 22 or 23, 2005? I hope you are available on that day.

We thank you in advance for your understanding while looking forward to hearing from you.

Sincerely,

John Doe
L.A.W. Corporation

OFFICE DOCUMENT MATCHING METHOD AND APPARATUS

FIELD

The present invention relates to a method and/or an apparatus which matches several documents having at least a common area.

INTRODUCTION

It has been difficult to stitch two images correctly in a conventional image processing algorithm. Therefore, when an user would like to copy a large document which is too large to copy the whole document at a time, it is difficult to obtain a reduced copy of the whole document because of the difficulty of stitching.

Therefore, it is desirable that it is easy to correctly match two documents having at least some overlap area.

SUMMARY

According to various embodiments, the present teachings can provide an image processing apparatus. The image processing apparatus can match two documents, a first document data and a second document data, having at least some overlap area. The image processing apparatus can comprise a common layout area finding unit, a common text finding unit, a feature point finding unit and a document combining unit.

The common layout area finding unit can extract layout features of the first document data and the second document data, and decide common layout areas of the first document data and the second document data based on the layout features. The common layout area can have the same layout in the first document data and the second document data, The common text finding unit can detect text data included in the common layout areas of the first document data and the second document data, and decide common text data in the common layout areas of the first document data and the second document data. The common text data can have same text data in the common layout areas of the first document data and the second document data.

The feature point finding unit can extract feature points of the common layout areas of the first document data and the second document data based on the common text data.

The document combining unit can combine the first document data and the second document data according to the feature points.

BRIEF DESCRIPTION OF THE DRAWINGS

FIGS. 3(a) and (b) illustrate a layout feature of first document data and a layout feature of a second document data according to certain embodiments.

FIG. 5 illustrates a combined document data according to certain embodiments.

DESCRIPTION OF CERTAIN EMBODIMENTS

An Image Processing Apparatus

Figure 1:
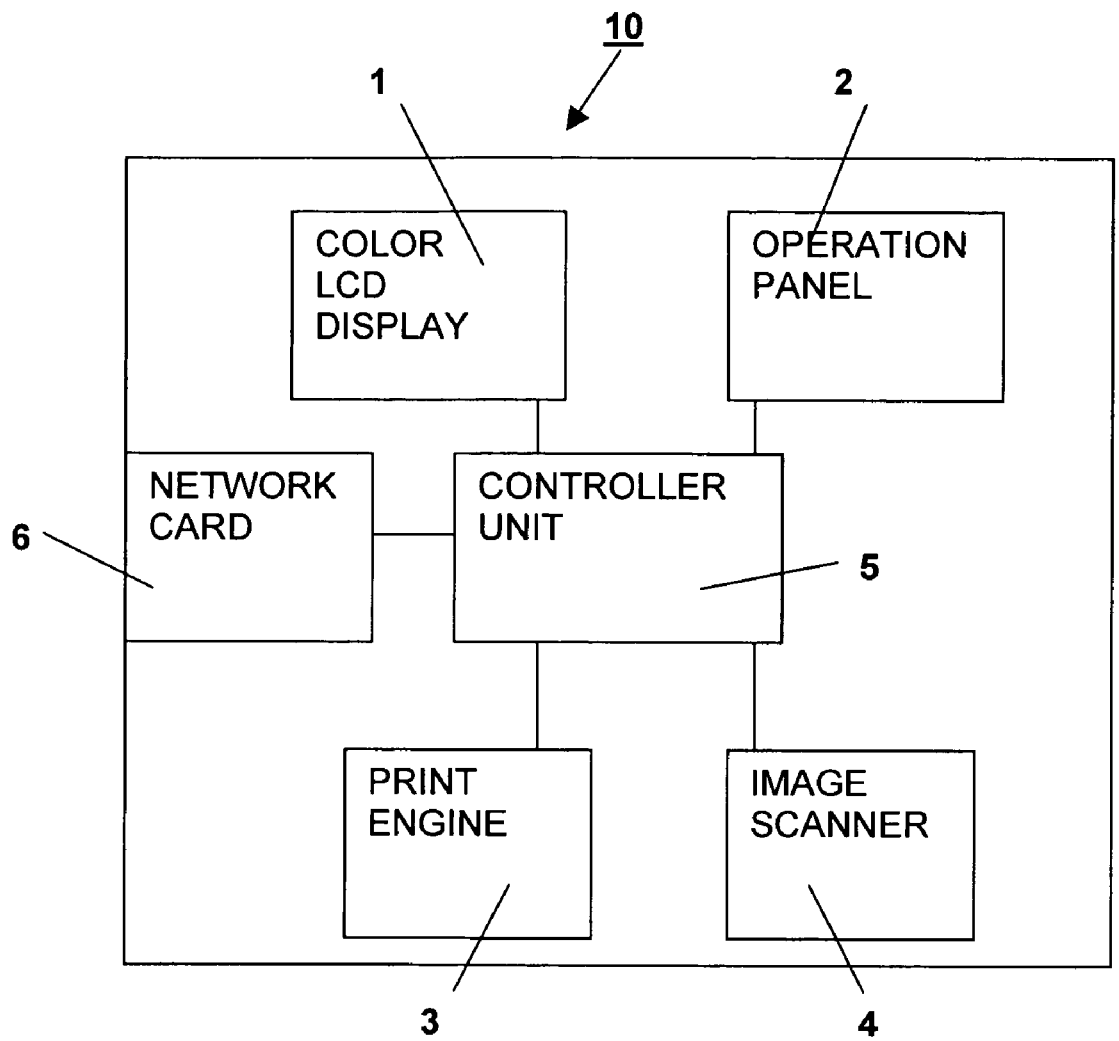
FIG. 1 illustrates a block diagram of an image processing apparatus according to certain embodiments.

An image processing apparatus can match at least two documents, a first document data and a second document data, having at least some overlap area. In certain embodiments, the image processing apparatus can match more than two documents.

The document data is a color, a glayscale or a black and white bitmap image data of a document. The document data can include not only text but also graphics and/or images.

Examples of the image processing apparatus for matching two documents consistent with certain embodiments of the invention include, but are not limited to, a personal computer (PC) with an application software for matching two documents, an image scanner, a digital copying apparatus and a multi functional printer (MFP). The digital copying apparatus and the multi functional printer can print by a way of a laser beam printing with toners, an ink jet printing with ink, a thermal printing with thermal dye and/or a silver halide printing with silver halide light sensitive material.

The image processing apparatus can comprise a control unit, a common layout area finding unit, a common text finding unit, a feature point finding unit and/or a document combining unit. The image processing apparatus can further comprise an input unit, an image reading unit and/or a display unit. The image processing apparatus can further comprise a print unit, a storing unit and/or a transmit unit.

In certain embodiments, the application software including an OCR software for matching two documents can be installed into the image processing apparatus. In certain embodiments, the application software and/or the OCR software can be recorded in a computer readable medium. Examples of the computer readable medium consistent with certain embodiments of the invention include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, Compact Flash™, Smart Media™, Memory Stick™, and the like.

In certain embodiments, the control unit can control the entire system of the image processing apparatus and/or the various units in the image processing apparatus. The control unit can run various software including the application software for matching two documents. The control unit can process and/or calculate several data. Examples of the control unit consistent with certain embodiments of the invention include, but are not limited to, a central processing unit (CPU) or a micro processing unit (MPU) with a memory and the application software necessary for the processing, and an integrated circuit (IC), an application specific integrated circuit (ASIC), a field programmable gate array (FPGA) and a programmable logic device (PLD). Examples of the memory consistent with certain embodiments of the invention include, but are not limited to, a random access memory (RAM) including NVRAM, M RAM, P RAM, Fe RAM, Flash RAM, and a read only memory (ROM).

In certain embodiments, the image reading unit can obtain the first document data and the second document data. In certain embodiments, the image reading unit can scan an original first document and an original second document and obtain the first document data and the second document data. In certain embodiments, the image reading unit can read a removable data recording medium in which the first document data and the second document data are recorded, and obtain the first document data and the second document data. In certain embodiments, the image reading unit can receive the first document data and the second document data transmitted from the other device connected with the image processing apparatus through a network (e.g., a local area network, an internet, a wide area network and the like), and obtain the first document data and the second document data. Examples of the image reading unit consistent with certain embodiments of the invention include, but are not limited to, an image scanner, a removable data recording medium recorder/reader, a network card and a LAN adaptor. Examples of a removable data recording medium for the removable data recording medium recorder/reader include, but are not limited to, a digital memory card, a compact disk (e.g., CD-R, CD-RW, etc.), and a digital versatile disk (e.g., DVD-R, DVD-RW, DVD+RW, etc.).

In certain embodiments, the display unit can display various images and texts including the first document, the second document, the combined document, the instruction of the document matching, the warning message showing combining two documents is impossible and the like. Examples of the display unit consistent with certain embodiments of the invention include, but are not limited to, a liquid crystal display (LCD), a Braun tube, a cathode ray tube (CRT) and a plasma display panel.

In certain embodiments, the user can input various data, information, response or instruction (e.g., a selection of document matching mode, an instruction to start scanning and/or printing and the like) to the image processing apparatus through the input unit of the image processing apparatus. Examples of the input unit consistent with certain embodiments of the invention include, but are not limited to, a keyboard, a mouse, a push button, a touch panel and an operation panel.

In certain embodiments, the transmit unit can transmit various data (e.g., the combined document data and the like) and various signal from the image processing apparatus to the other device connected to the image processing apparatus, and receive various data (e.g., the first document data, the second document data and the like) and various signal from the other device connected with the image processing apparatus. Examples of the transmit unit consistent with certain embodiments of the invention include, but are not limited to, a LAN adapter, a modem and a network card.

In certain embodiments, the storing unit of the image processing apparatus can store several software including the application software comprising the OCR software for matching two documents. In certain embodiments, the storing unit can store several data including the first document data, the second document data, the combined document data, the layout feature, the common layout area, the text data, the common text data, the feature point and the like. Example of the storing unit consistent with certain embodiments of the invention include, but are not limited to, a hard disk, a memory (e.g., a RAM including NVRAM, M RAM, P RAM, Fe RAM, Flash RAM, and a ROM) and a removable data recording medium recorder/reader.

In certain embodiments, the print unit of the image processing apparatus can print the combined document image, the first document and/or the second document on a recording sheet. For instance, the recording sheet can be a paper, OHP film and so on. Examples of the print unit consistent with certain embodiments of the invention include, but are not limited to, an image forming unit or a print engine for the laser beam color MFP or the color LBP, an ink jet head of the color IJP and a thermal head of the color thermal printer. In certain embodiments, the print engine or the image forming unit can comprise a laser beam scanning unit, a photo-sensitive drum (in other words, a photoconductor), a cleaning unit, an eraser lamp, a charging charger, a developing device, a transmit charger and so on. In certain embodiments, the image forming unit or the print engine for the color LBP, the color laser beam MFP can comprise one laser beam scanning unit and several imaging units corresponding to each color of C (cyan), M (magenta), Y (yellow) and K (black) and comprising the photo-sensitive drum, the cleaning unit, the eraser lamp, the charging charger, the developing device, the transmit charger and so on.

In certain embodiments, the common layout area finding unit can extract layout features of the first document data and the second document data. The layout feature can include information about the position, the size, the length, the width, the height, the direction of layout blocks, the distance between several layout blocks and the like. The layout block is a block of texts and/or images separated with another block of texts and/or images by a space having size more than predetermined value. The size of the space which defines the layout block can be set in user's discretion beforehand. The common layout area finding unit can detect and extract the layout block based on the predetermined size of the space. After extracting the layout blocks, the common layout area finding unit can detect and extract layout features.

In certain embodiments, the common layout area finding unit can decide at least one common layout area of the first document data and the second document data based on the layout features. In certain embodiments, the common layout finding unit can compare the layout feature of the first document data with the layout feature of the second document data in order to decide the common layout area. The common layout finding unit can compare length elements of the layout blocks in the layout features of the first document data with length elements of the layout blocks in the layout features of the second document data. The length element of the layout block can comprise the size, the width and/or the height of the layout block, and/or the distance between several layout blocks. The common layout finding unit can compare the other conditions (e.g., the direction of the layout blocks, the relative interrelation of the several layout blocks such as the ratio of the size and the like) of the layout feature of the first document data with the other conditions of the layout feature of the second document data.

The common layout areas can be the layout blocks of the first document data and the second document data which have some same conditions of layout feature. The common layout area of the first document data and the common layout area of the second document data can have some same values of the condition of the layout feature (e.g., the length element of the layout blocks (the size, the width and/or the height of the layout block, the distance between several layout blocks), the direction of the layout blocks and the like), and the number of the conditions having same values can be more than predetermined value.

In case that the zoom ratio of the first document is different from the zoom ratio of the second document, and the common layout area finding unit finds that the relative interrelation such as a size ratio between layout blocks in the first document data is same as the relative interrelation such as a size ratio between layout blocks in the second document data, the common layout area finding unit can compare the layout feature of the first document data with the layout feature of the second document feature after reducing one of the first document data and the second document data so that the two document data can be same zoom ratio.

In case that the layout block of the first document data and/or the second document data is skew, the common layout area finding unit can compare the layout feature of the first document data with the layout feature of the second document feature after correcting the skew of the first document data and/or the second document data so that the direction of the layout block can be horizontal.

In certain embodiments, the common text finding unit can detect text data included in the common layout areas of the first document data and the second document data which are bitmap image data. The common text finding unit can detect the text data included in the common layout areas according to the OCR software.

After detecting the text data, the common text finding unit can compare the text data included in the common layout areas in order to decide the common text data according to the application software. The common text data finding unit can deem the text data in the common layout areas as the common text data if the text data in the common layout areas have at least predetermined number of same characters (which can include a space) in series. The predetermined number of the same characters can be set in the user's discretion. As a result of comparison by the common text data finding unit, the common text data finding unit can decide the common text data.

In certain embodiments, the feature point finding unit can extract feature points of the common layout area of the first document data and the second document data based on the common text data. The feature point finding unit can extract feature points from the common text of the first document data and the second document data. Preferably, the feature point finding unit can extract the several feature points. In certain embodiments, the feature point finding unit can extract the feature point according to the algorithm of homography.

In certain embodiments, the document combining unit can combine the first document data and the second document data according to the feature points. The document combining unit can combine the first document data and the second document data so that the feature points of the first document data can superimpose on the feature points of the second document data.

Examples of the common layout area finding unit, the common text data finding unit, the feature point finding unit and the document combining unit with certain embodiments of the invention include, but are not limited to, a CPU or a MPU with a memory and the application software necessary for the processing, and an IC, an ASIC, a FPGA and a PLD. The common layout area finding unit, the common text data finding unit, the feature point finding unit and the document combining unit can be integrated into one device or can be divided into several devices. Each of the common layout area finding unit, the common text data finding unit, the feature point finding unit and the document combining unit can comprise several devices. The common layout area finding unit, the common text data finding unit, the feature point finding unit and/or the document combining unit can be integrated with the control unit.

EXAMPLE

One example of the method and the apparatus for matching several documents is described in the following. This invention is not limited to the following example.

In this embodiments, the image processing apparatus is a color multi function printer (MFP) 10. The color MFP 10 can have a function of a copying apparatus, a function of a printer and a function of a scanner. The color MFP 10 can print in color utilizing color toners of C (cyan), M (magenta), Y (yellow) and K (black). In certain embodiments, as illustrated in FIG. 1, the color MFP 10 can comprise the display unit (e.g., a color LCD display 1), the input unit (e.g., an operation panel 2), the print unit (e.g., a print engine 3), the image reading unit (e.g., an image scanner 4), the transmit unit (e.g., a network card 6), the control unit (e.g., a controller unit 5 comprising a CPU, a ROM and a RAM), the common layout area finding unit (e.g., the controller unit 5), the common text finding unit (e.g., the controller unit 5), the feature point finding unit (e.g., the controller unit 5) and the document combining unit (e.g., the controller unit 5). In this example, the control unit, the common layout area finding unit, the common text finding unit, the feature point finding unit and the document combining unit can be integrated into one controller unit 5. The print engine 3 can comprise four photoconductors for each of C, M, Y, and K and a laser emitting device. The application software for matching two documents including the optical character reader (OCR) software can be stored in the ROM and/or the RAM of the controller unit 5.

Figure 2A:
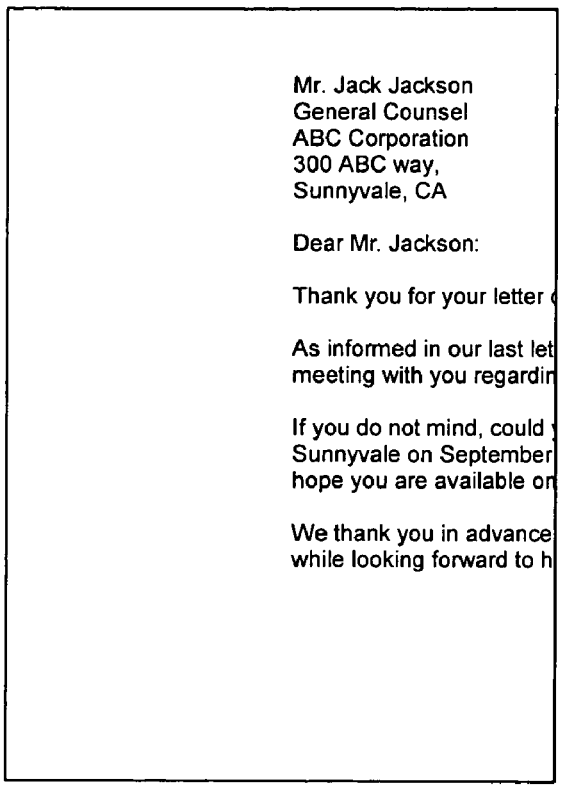
FIGS. 2(a) and (b) illustrate a first document data and a second document data according to certain embodiments.
Figure 2B:
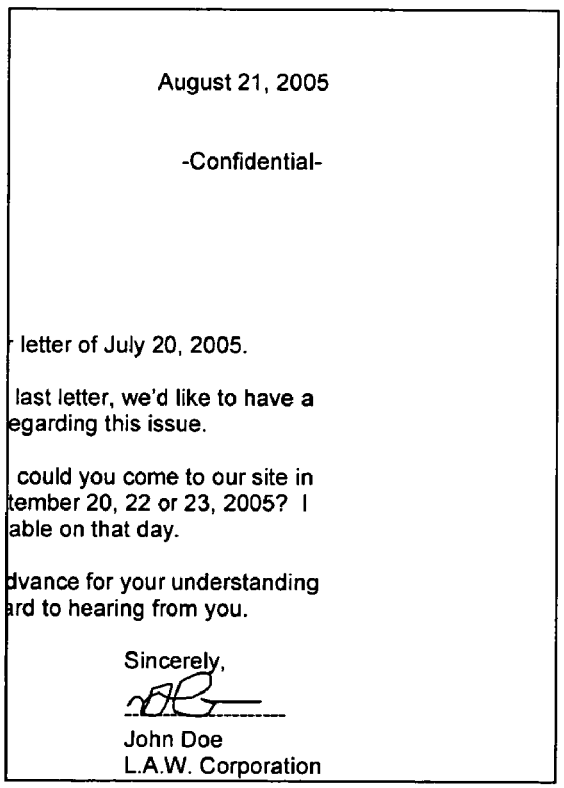

In this example, a first document 11 and a second document 12 can be combined into one document. As illustrated in FIGS. 2 (*a*) and (*b*), the two documents, the first document 11 and the second document 12 can have an overlap area. Each of the first document 11 and the second document 12 shows a part of a business letter.

Figure 6:
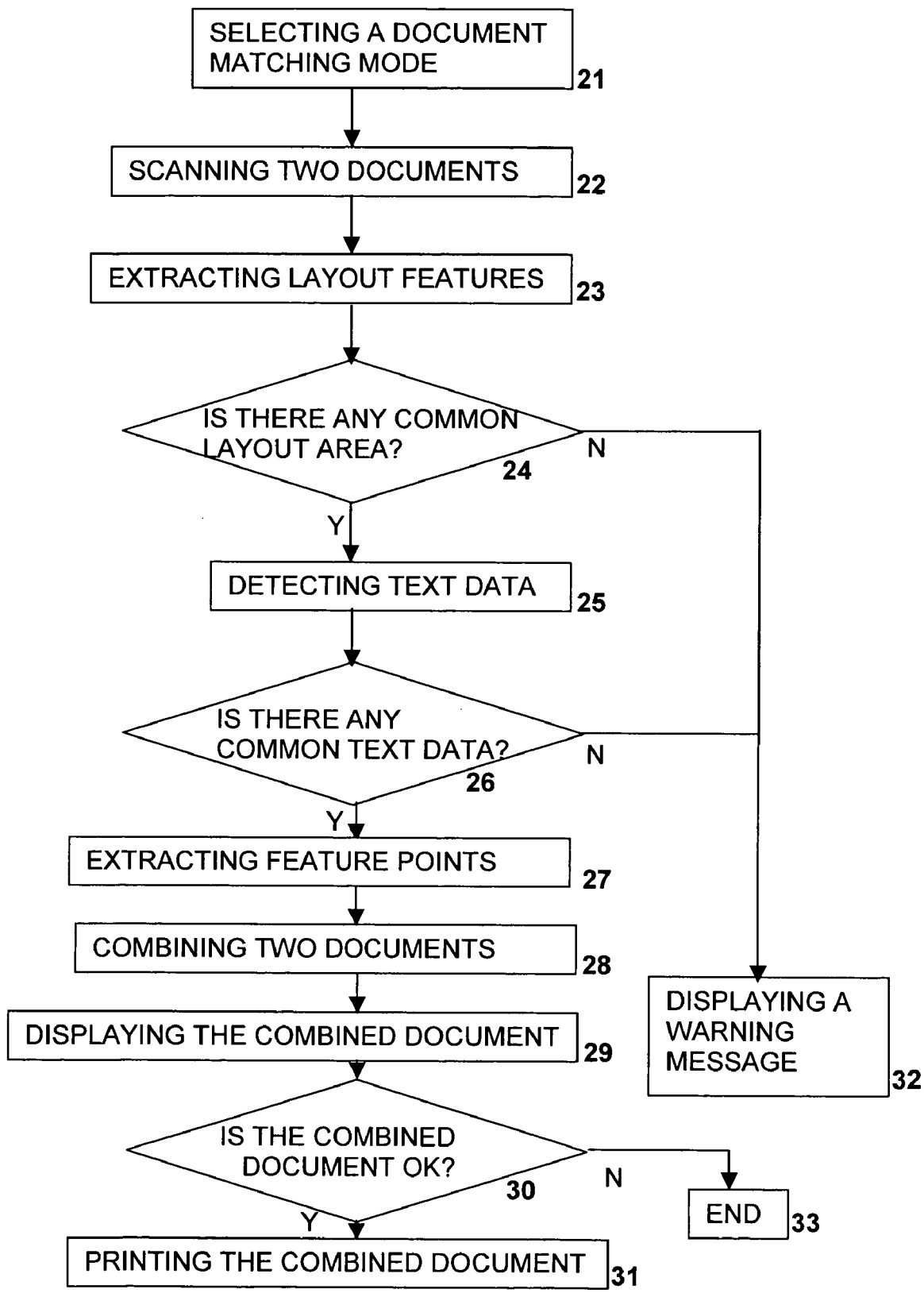
FIG. 6 illustrates a flowchart describing the matching of two documents according to certain embodiments.

If the user wants to combine two documents into one document by the color MFP 10, the user can select "a document matching mode" by the operation panel 2. (21 in FIG. 6) In certain embodiments, the instruction about how to combine two documents can be displayed on the color LCD display 1 and the user can follow the instruction.

The first document 11 and the second document 12 can be scanned by the image scanner 4 of the color MFP 10. (22 in FIG. 6) By the scanning, the first document data and the second document data which are bitmap image data can be obtained. The first document data 11 and the second document data 12 can be stored in the RAM of the controller unit 5.

The controller unit 5 as the common layout area finding unit can extract the layout feature of the first document data 11 according to the application software stored in the controller unit 5. (23 in FIG. 6) The layout feature can include information about the length elements of the layout blocks (e.g., the size, the length, the width, the height, the distance between several layout blocks and the like).

The controller unit 5 can extract the layout blocks from the first document data and the second document data in order to extract layout features. In this example, if a block of texts and/or images are separated with another block of texts and/or images by a space larger than the font size of 9 point, the controller 5 can deem the block of texts and/or images as one layout block.

After defining the layout blocks in the first document data 11, the controller 5 can extract the layout feature 13 of the first document data as illustrated in FIG. 3(*a*). The layout feature of the first document includes six (6) layout blocks 131, 132, 133, 134, 135 and 136. Further, the layout feature of the first document data can comprise the information about the length element of the layout blocks shown in Table A.

TABLE A

| LAYOUT BLOCK NO. | WIDTH (cm) | HEIGHT (cm) | DISTANCE FROM THE NEXT LAYOUT BLOCK (cm) | DISTANCE FROM THE OTHER NEXT LAYOUT BLOCK (cm) |
|---|---|---|---|---|
| 131 | 5.2 | 5.7 | — | 2.0 |
| 132 | 6.2 | 1.5 | 2.0 | 2.0 |
| 133 | — | 1.5 | 2.0 | 2.0 |
| 134 | — | 3.3 | 2.0 | 2.0 |
| 135 | — | 5.1 | 2.0 | 2.0 |
| 136 | — | 3.3 | 2.0 | — |

The width of the layout block (133, 134, 135 and 136) whose end reaches to the edge of the first document data can be deemed as incapable measurement. The "height" is the length in the direction perpendicular to the sentence direction. The "distance from the next layout block" can be the distance from the upper next layout block. The "distance from the other next layout block" can be the distance from the lower next layout block.

The layout feature 14 of the second document data can be also extracted by the same way as the above. The layout feature 14 of the second document data can include seven (7) layout blocks 141, 142, 143, 144, 145, 146 and 147. Further, the layout feature of the second document data can comprise the information about length element of the layout blocks shown in Table B.

TABLE B

| LAYOUT BLOCK NO. | WIDTH (cm) | HEIGHT (cm) | DISTANCE FROM THE NEXT LAYOUT BLOCK (cm) | DISTANCE FROM THE OTHER NEXT LAYOUT BLOCK (cm) |
|---|---|---|---|---|
| 141 | 5.2 | 1.5 | — | 2.7 |
| 142 | 4.5 | 1.5 | 2.7 | 8.5 |
| 143 | — | 1.5 | 8.5 | 2.0 |
| 144 | — | 3.3 | 2.0 | 2.0 |
| 145 | — | 5.1 | 2.0 | 2.0 |
| 146 | — | 3.3 | 2.0 | 2.0 |
| 147 | 6.2 | 6.0 | 2.0 | — |

The extracted layout features 13, 14 and Table A, B can be stored in the RAM of the controller unit 5.

Next, the controller unit 5 can compare the layout feature 13 of the first document data with the layout feature 14 of the second document data according to the application software in order to decide the common layout area. (24 in FIG. 6)

In this example, if the controller 5 finds the layout blocks in the layout features of the first document data and the second document data whose at least three values of the length elements of the layout blocks among the four values of the length elements of the layout blocks (i.e., the width, the height, the distance from the next layout block and the distance from the other next layout block) in the layout features shown in Table A and B are same, the controller 5 can deem the layout blocks of the first document data and the second document data as the common layout area.

In this example, the layout block 134 of the layout feature 13 of the first document data and the layout block 144 of the layout feature 14 of the second document data has three same values of the length elements of the layout blocks among four values of the length elements of the layout blocks. (the height is 3.3 cm, the distance from the next layout block is 2.0 cm, and the distance from the other next layout block is 2.0 cm) Also, the layout block 135 of the layout feature 13 of the first document data and the layout block 145 of the layout feature 14 of the second document data has three same values of the length elements of the layout blocks among four values of the length element of the layout blocks. (the height is 5.1 cm, the distance from the next layout block is 2.0 cm, and the distance from the other next layout block is 2.0 cm) Therefore, the controller 5 can deem the layout blocks 134 and 144 as the common layout areas. Also, the controller 5 can deem the layout blocks 135 and 145 as the common layout areas.

The common layout area can be decided based on the layout feature by the way in the above. The common layout area can be stored in the RAM of the controller unit 5.

In certain embodiments, considering the case that one document data may be upside-down, if the "distance from the next layout block" in the first document data is same as the "distance from the other next layout block" in the second document, and the "distance from the other next layout block" in the first document data is same as the "distance from the next layout block" in the second document data, the controller 5 can deem the layout blocks of the first document data and the second document data have at least two same values of the length elements.

If the controller unit 5 judges there is no common layout area between the first document data and the second document data, the color LCD display 1 can display a warning message stating that it is impossible to combine the two documents. (32 in FIG. 6)

Then, the controller unit 5 as the common text finding unit can detect text data included in the common layout areas of the first document data and the second document data which are the bitmap image data according to the OCR software stored in the controller unit 5. (25 in FIG. 6) In this example, the controller unit 5 can detect the text data included in the common layout areas as shown in Table C. The detected text data can be stored in the RAM of the controller 5.

TABLE C

| COMMON LAYOUT AREA OF THE FIRST DOCUMENT DATA | TEXT DATA | COMMON LAYOUT AREA OF THE SECOND DOCUMENT DATA | TEXT DATA |
|---|---|---|---|
| 134 | As informed in our last let : meeting with you regardi | 144 | last letter, we'd like to have a : egarding this issue. |
| 135 | If you do not mind, could : Sunnyvale on September : hope you are available or | 145 | could you come to our site in : tember 20, 22 or 23, 2005? I : able on that day |

In certain embodiments, if the controller unit cannot detect text data included in the common layout area according to the OCR software, the controller unit can reverse up and down of the first document data or the second document and then can start from extracting the layout feature again, start from finding the common layout area again or start from detecting text data included in the common text data again.

After detecting the text data, the controller 5 can compare the text data included in the common layout areas in order to decide the common text data according to the application software stored in the RAM of the controller 5. (26 in FIG. 6) In this example, the controller 5 can deem the text data in the common layout areas 134, 144 and 135, 145 as the common text data if the text data in the common layout areas have at least four (4) same characters (including a space) in series.

Figure 4A:
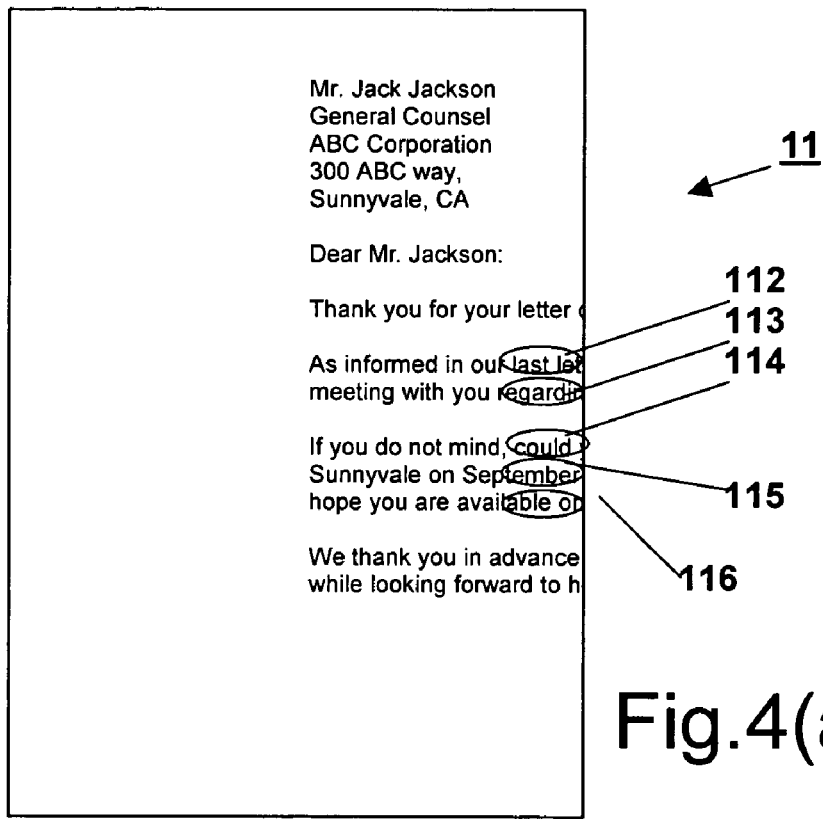
FIGS. 4(a) and (b) illustrate common text data according to certain embodiments.
Figure 4B:
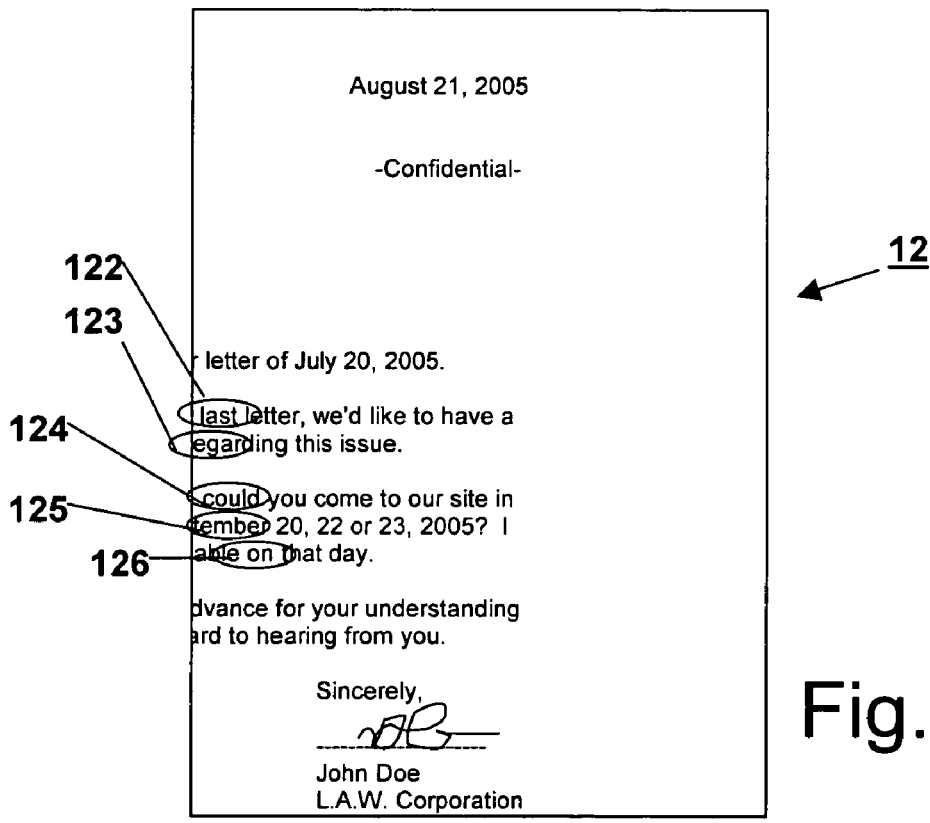

As a result of comparison by the controller 5, the controller 5 can find that the common layout area 134 of the first document data and the common layout area 144 of the second document data have the common text data which is "last let" 112, 122 and "egard" 113, 123 as illustrated in FIGS. 4 (*a*) and (*b*). Also, the common layout area 135 of the first document data and the common layout area 145 of the second document data have the common text data which is "could" 114, 124, "tember" 115, 125 and "able o" 116, 126. The common text data can be stored in the RAM of the controller 5.

If the controller 5 judges there is no common text data between the common layout area in the first document data and the common layout area in the second document data, the color LCD display 1 can display a warning message stating that it is impossible to combine the two documents. (32 in FIG. 6)

After finding the common text data, the controller 5 as the feature point finding unit can extract the feature point of the common text data according to the application software stored in the RAM of the controller 5. (27 in FIG. 6) Preferably, the several feature points can be extracted. The feature points of the common text data can be found according to the algorithm of homography. The feature points can be stored in the RAM of the controller unit 5.

After extracting the feature point, the controller unit 5 as the document combining unit can combine the first document data 11 and the second document data 12 according to the feature points. (28 in FIG. 6) The controller unit 5 can combine the first document data 11 and the second document data 12 by superposing the feature points in the common text data 112, 113, 114, 115 and 116 of the first document data with the feature points in the common text data 122, 123, 124, 125 and 126 of the second document data. More feature points in the other common area can be used for combining the first document data and the second document data. By superposing several feature points, it is possible to combine two documents data correctly.

As illustrated in FIG. 5, the combined document 100 which is a bitmap image data can be obtained by combining the first document data and the second document data according to the feature points. The combined document 100 can be stored in the RAM of the controller unit 5 and be displayed on the color LCD display 1. (29 in FIG. 6)

After the user confirms the combined document 100 on the color LCD display 1, the user can instruct to start to print the combined document 100 from the operation panel 2 if the user is satisfied with the combined document 100. (30 in FIG. 6) If the user instructs to start to print the combined document 100, the controller unit 5 can transmit the combined document data from the RAM to the print engine 3 and make the print engine 3 print the combined document 100 in color image. (31 in FIG. 6) For printing, the conventional way can be applied. If the user is not satisfied with the combined document 100, the user can instruct to finish the image processing from the operation panel 2 and the process ends. (33 in FIG. 6)

While the color MFP is utilized as the image processing apparatus to combine two document data, the other device can be utilized as the image processing apparatus. In certain embodiments, the image scanner can combine two document data like the above. In certain embodiments, the personal computer (PC) including the application software for matching documents can combine two document data like the above.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for matching two documents, which are represented by first document data and second document data, respectively, having at least an overlap area, the method comprising the steps of:

extracting first layout blocks from the first document data and second layout blocks from the second document data, and extracting a first layout feature of the first document data based on the first layout blocks and a second layout feature of the second document data based on the second layout blocks, the first layout feature for the first layout block and the second layout feature for the second layout block including items describing a vertical size of the respective first layout block or the second layout block, a horizontal size of the respective first layout block or the second layout block, and a distance from a layout block preceding the first layout block or the second layout block on the two documents to a layout block subsequent to the first layout block or the second layout block on the two documents, wherein each of the first and second layout blocks comprises a block of text and images separated from another block of text and images by a space;

deciding common layout areas of the first document data and the second document data based on first and second the layout features, the common layout area having the same layout in the first document data and the second document data wherein when a predetermined number of first layout features and second layout features match, the first layout block and the second layout block are determined to comprise at least one common layout area, and wherein the predetermined number of the items is less than a total number of items described in the first layout feature and the second layout feature;

detecting text data included in the common layout areas of the first document data and the second document data, deciding common text data in the common layout areas of the first document data and the second document data, the common text data having same text data in the common layout areas of the first document data and the second document data;

extracting feature points of the common layout areas of the first document data and the second document data based on the common text data; and combining the first document data and the second document data according to the feature points.

2. The method of claim 1, wherein extracting the first layout feature of the first document data and a second layout feature of the second document data comprises extracting layout blocks of the first document data and extracting layout blocks of the second document data, and wherein the step for deciding common layout areas comprises a step for comparing length elements of the layout blocks of the first document data with length elements of the layout blocks of the second document data.

3. The method of claim 1, wherein the step for deciding common layout areas comprises a step for comparing length elements of a sentence of the first document data with length elements of a sentence of the second document data.

4. The method of claim 1, wherein the step of extracting feature points is conducted according to an algorithm of homography.

5. A computer readable medium containing a computer program for matching two documents, which are represented by first document data and second document data, respectively, having at least an overlap area, the program containing instructions for directing the computer to execute the steps of:

extracting first layout blocks from the first document data and second layout blocks from the second document data, and extracting a first layout feature of the first document data based on the first layout blocks and a second layout feature of the second document data based on the second layout blocks, the first layout feature for the first layout block and the second layout feature for the second layout block including items describing a vertical size of the respective first layout block or the second layout block, a horizontal size of the respective first layout block or the second layout block, and a distance from a layout block preceding the first layout block or the second layout block on the two documents to a layout block subsequent to the first layout block or the second layout block on the two documents, wherein each of the first and second layout blocks comprises a block of text and images separated from another block of text and images by a space;

deciding common layout areas of the first document data and the second document data based on the first and second layout features, the common layout area having the same layout in the first document data and the second document data, wherein when a predetermined number of first layout features and second layout features match, the first layout block and the second layout block are determined to comprise at least one common layout area, and wherein the predetermined number of the items is less than a total number of items described in the first layout feature and the second layout feature;

detecting text data included in the common layout areas of the first document data and the second document data, deciding common text data in the common layout areas of the first document data and the second document data, the common text data having same text data in the common layout areas of the first document data and the second document data;

extracting feature points of the common layout areas of the first document data and the second document data based on the common text data; and combining the first document data and the second document data according to the feature points.

6. An image processing apparatus for matching two documents, which are represented by first document data and second document data, respectively, having at least an overlap area, comprising:

a processor coupled to memory;

a common layout area finding unit, which extracts first layout blocks from the first document data and second layout blocks from the second document data, and extracts a first layout feature of the first document data based on the first layout blocks and a second layout feature of the second document data based on the second layout blocks, the first layout feature for the first layout block and the second layout feature for the second layout block including items describing a vertical size of the respective first layout block or the second layout block, a horizontal size of the respective first layout block or the second layout block, and a distance from a layout block preceding the first layout block or the second layout block on the two documents to a layout block subsequent to the first layout block or the second layout block on the two documents, wherein each of the first and second layout blocks comprises a block of text and images separated from another block of text and images by a space, and decides common layout areas of the first document data and the second document data based on the first and second layout features, the common layout area having the same layout in the first document data and the second document data, wherein when a predetermined number of first layout features and second layout features match, the first layout block and the second layout block are determined to comprise at least one common layout area, and wherein the predetermined number of the items is less than a total number of items described in the first layout feature and the second layout feature;

a common text finding unit which detects text data included in the common layout areas of the first document data and the second document data, and decides common text data in the common layout areas of the first document data and the second document data, the common text data having same text data in the common layout areas of the first document data and the second document data;

extracting feature points of the common layout areas of the first document data and the second document data based on the common text data; and a document combining unit which combines the first document data and the second document data according to the feature points.

7. The image processing apparatus of the claim 6, wherein the image processing apparatus further comprises an image reading unit which obtains the first document data and the second document data.

8. The image processing apparatus of the claim 7, wherein the image reading unit is an image scanner which scans original documents and obtains the first document data and the second document data.

9. The image processing apparatus of the claim 6, wherein the image processing apparatus further comprises a print unit which prints a combined document in which the first document data and the second document data are combined by the document combining unit.

* * * * *